United States Patent
Noh

(10) Patent No.: US 8,049,795 B2
(45) Date of Patent: Nov. 1, 2011

(54) LENS SHADING COMPENSATION APPARATUS AND METHOD, AND IMAGE PROCESSOR USING THE SAME

(75) Inventor: Yo-Hwan Noh, Ansan (KR)

(73) Assignee: Mtekvision Co., Ltd., Seoul (KR)

(*) Notice: Subject to any disclaimer, the term of this patent is extended or adjusted under 35 U.S.C. 154(b) by 663 days.

(21) Appl. No.: 12/159,361

(22) PCT Filed: Dec. 28, 2006

(86) PCT No.: PCT/KR2006/005846
§ 371 (c)(1),
(2), (4) Date: Jun. 28, 2008

(87) PCT Pub. No.: WO2007/075067
PCT Pub. Date: Jul. 5, 2007

(65) Prior Publication Data
US 2008/0291302 A1 Nov. 27, 2008

(30) Foreign Application Priority Data
Dec. 28, 2005 (KR) .................. 10-2005-0131622

(51) Int. Cl.
H04N 9/64 (2006.01)
H04N 5/217 (2006.01)
H04N 5/228 (2006.01)
H04N 5/225 (2006.01)
G02B 13/16 (2006.01)
G06K 9/00 (2006.01)
G06K 9/40 (2006.01)

(52) U.S. Cl. .................. 348/251; 348/222.1; 348/241; 348/335; 348/340; 382/167; 382/254; 382/274

(58) Field of Classification Search ................. 348/222.1, 348/241, 251, 335, 340; 382/167, 274, 254
See application file for complete search history.

(56) References Cited

U.S. PATENT DOCUMENTS

| | | | |
|---|---|---|---|
| 6,195,469 B1* | 2/2001 | Nishioka et al. | 382/274 |
| 7,075,569 B2* | 7/2006 | Niikawa | 348/218.1 |
| 2002/0008760 A1* | 1/2002 | Nakamura | 348/222 |
| 2002/0025164 A1* | 2/2002 | Suzuki | 396/429 |
| 2003/0156190 A1* | 8/2003 | Sato et al. | 348/94 |
| 2004/0174445 A1* | 9/2004 | Kawakami et al. | 348/251 |

(Continued)

FOREIGN PATENT DOCUMENTS

JP    9-307789 A2    11/1997

(Continued)

*Primary Examiner* — Jason Chan
*Assistant Examiner* — Michael Osinski
(74) *Attorney, Agent, or Firm* — Birch, Stewart, Kolasch & Birch, LLP

(57) ABSTRACT

Disclosed are a lens shading compensation apparatus and a lens shading compensation method in an image sensor that compensate the difference in signal amplitude according to the position of pixels to preserve the quality of a primitive image. The lens shading compensation apparatus includes a pixel value analyzing part, an auto exposure value setting part, a central pixel detecting part, a table generating part, a pixel location calculating part, a mask image generating part and a compensation part. The above apparatus and method perform a color interpolation individually for red, green and blue, and then compensate a lens shading image for each color in accordance with its characteristics. Also the above apparatus and method can analyze and compensate a lens shading phenomenon without considering other colors or being interrupted by other colors.

13 Claims, 11 Drawing Sheets

U.S. PATENT DOCUMENTS

| | | | |
|---|---|---|---|
| 2004/0207736 A1* | 10/2004 | Muramatsu | 348/254 |
| 2004/0257454 A1* | 12/2004 | Pinto et al. | 348/222.1 |
| 2005/0270402 A1* | 12/2005 | Nikkanen et al. | 348/335 |
| 2006/0061842 A1* | 3/2006 | Oka et al. | 358/522 |
| 2008/0043117 A1* | 2/2008 | Kim et al. | 348/224.1 |

FOREIGN PATENT DOCUMENTS

| | | |
|---|---|---|
| JP | 2003-018447 A2 | 1/2003 |
| JP | 2003-244526 A | 8/2003 |

\* cited by examiner

LENS SHADING COMPENSATION APPARATUS AND METHOD, AND IMAGE PROCESSOR USING THE SAME

CROSS-REFERENCE TO RELATED APPLICATIONS

This application claims foreign priority benefits under 35 U.S.C. .sctn. 119(a)-(d) to PCT/KR2006/005846, filed Dec. 28, 2006, which is hereby incorporated by reference in its entirety.

BACKGROUND

1. Technical Field

The present invention relates to an image sensor, more particularly to a lens shading compensation apparatus and a lens shading compensation method in the image sensor that compensate the difference in signal amplitude according to the position of pixels to preserve the quality of a primitive image.

2. Description of the Related Art

Recently, portable devices having an image sensor (e.g. digital cameras, mobile communication terminals, etc.) have been introduced in the market. The image sensor is composed of an array of photosensitive diodes called pixels or photosites.

The pixel itself usually does not extract colors from light, but converts photons in a broad spectrum band into electrons. In order to record color images by a single sensor, the sensor is filtered such that different pixels receive different colors. This type of sensor is known as a color filter array (CFA). Different color filters are arranged across the sensor according to a predefined pattern.

As a most common pattern, a Bayer pattern is widely employed in the CFA. In the Bayer pattern, a half of the total number of pixels is green (G), and two quarters of the total number are assigned to red (R) and blue (B). In order to obtain color information, red, green and blue filters are arranged in a particular sequence to form a repetitive pattern. The Bayer pattern is composed of a 2×2 array.

The Bayer pattern is based on the premise that the human eye derives most of the luminance data from the green light. Therefore, an image with a higher resolution can be generated when more of the pixels are made to be green, compared to when an equal number of red, green, and blue pixels alternate.

However, the conventional image sensor in recently marketed portable devices had a problem of image distortion due to the geometric pattern of the pixel array. This is because of its small outer lens and high f number.

FIG. 1 illustrates the disparity in transmissivity between the central part and the periphery of a lens. As illustrated in FIG. 1, the pixels in the central part and the pixels in the periphery of the CFA of the image sensor are exposed to a light source from different positions.

These minute differences in position cause differences in illumination, and the differences in illumination affect color because of differences in light frequency and refractive index. Consequently, color distortion and reduction in signal amplitude dependant on the position of the pixels inevitably occur, degrading the quality of primitive images. Such a phenomenon is referred to as lens shading phenomenon.

FIG. 2(a) and FIG. 2(b) are diagrams illustrating the center points and characteristics of lens shading images formed according to red (R), green (G) and blue (B) lights. As shown in FIG. 2(a), a center point 210 of a pixel array 200 does not coincide with any of center points 213, 216, 219 of the lens shading images 203, 206, 209 formed on the pixel array 200 of an image sensor according to red, green and blue lights that passed through the lens. Furthermore, as shown in FIG. 2(b) it is noted that the lens shading images have different characteristics 223, 226, 229 of the lens shading images.

In order to compensate the lens shading phenomenon has been introduced a method that equalizes the brightness of all the pixels of the pixel array after photographing an image of a white area.

FIG. 3 is a flow chart showing a conventional image processing method for making the brightness uniform.

Referring to FIG. 3, after a primitive image is inputted (S310), black level compensation (S320) and noise removal (S330) are performed. Subsequently, lens shading compensation (S340) and color interpolation (S350) are performed. Then, the quality of images is improved (S360) through color adjustment, gamma conversion, format conversion, etc., and image data is finally outputted to a display unit (S370).

However, he above lens shading compensation (S340) is applied under a premise that the lens shading images of red, green and blue colors have the same shape and center points. Moreover, prior to the color interpolation S350, each of the pixels of the pixel array has a pixel value on any one among red, green and blue colors in accordance with the Bayer pattern, and neighboring pixels have each different color component, so that it is difficult to compensate the lens shading image for each color without an interruption of other colors.

FIG. 4(a), FIG. 4(b), and FIG. 4(c) illustrate lens shading images of another embodiment.

Referring to FIG. 4(a), a center point 415 of a lens shading image 405 is deviated to the left with respect to a center point 410 of a pixel array 400. Referring to FIG. 4(b), the lens shading image is either tilted 425 or not tilted 420 against a longitudinal direction of the pixel array 400. Referring to FIG. 4(c), the lens shading image 405 is either tilted 435 or not tilted 430 against a lateral direction of the pixel array 400.

When tilted along the longitudinal direction 425 or the lateral direction 435, the lens shading image 405 cannot have a uniform luminance. However, there has not been proposed yet a method to compensate the tilting characteristic of the lens shading image 425 or 435.

SUMMARY

In order to solve the problems described above, the present invention provides an image processor, a lens shading compensation apparatus and a lens shading compensation method that perform a color interpolation for red, green and blue individually, and then compensate a lens shading image for each color in accordance with its characteristics.

Also, the present invention provides an image processor, a lens shading compensation apparatus and a lens shading compensation method that can analyze and compensate a lens shading phenomenon without considering other colors or being interrupted by other colors.

Also, the present invention provides an image processor, a lens shading compensation apparatus and a lens shading compensation method that can compensate a tilted lens shading image.

Other objects of the present invention will become more apparent through the embodiments described below.

In order to achieve the above objects, an aspect of the present invention provides a lens shading compensation apparatus. In an embodiment of the present invention, the lens shading compensation apparatus includes: a pixel value analyzing part generating luminance information from primitive image data, the primitive image data being color interpolated so that each pixel has red, green and blue components, the luminance information being generated for each color; an auto exposure value setting part measuring an average luminance of a portion of a pixel array through the luminance information and setting the average luminance as an auto exposure value, the portion of the pixel array being positioned around a first central pixel of the pixel array; a central pixel detecting part detecting a second central pixel from a lens shading image corresponding to the luminance information; a table generating part partitioning the pixels in units of block according to the distance from the second central pixel, generating and storing a compensation value per block corresponding to the auto exposure value; a pixel location calculating part calculating the distance between an object pixel and the second central pixel; a mask image generating part producing a compensation value for the object pixel by using the compensation value per block corresponding to the distance between the object pixel and the second central pixel, and creating a shading mask image per color; and a compensation part generating pixel compensation information by combining the primitive image data with the shading mask image.

The central pixel detecting part detects the second central pixel by using intersection points on a closed curve, the curve being produced by a luminance boundary value, the luminance boundary value set to be located between a minimum value and a maximum value of the luminance information on each pixel of the pixel array, the closed curve being intersected by a horizontal central line or a vertical central line both passing through the first central pixel at the intersection points.

The auto exposure value setting part sets an upper auto exposure limit and a lower auto exposure limit such that the auto exposure value is positioned therebetween.

The table generating part partitions the pixels in units of block according to the distance from the second central pixel, and continues to apply a different compensation value to the pixels included in the block until it finds a compensation value, at which the largest number of pixels have a value between the upper auto exposure limit and the lower auto exposure limit, and stores the compensation value as the compensation value per block.

The above lens shading compensation further includes a slope detecting part that detects a slope of the lens shading image.

The mask image generating part generates a tilted mask image to compensate the slope, and the compensation part produces the pixel compensation information by combining the shading mask image and the tilted mask image with the primitive image data.

In another embodiment of the present invention, an image processor of an image apparatus compensating a lens shading phenomenon—wherein the image apparatus comprises a sensor unit, the image processor and a display unit—, the image processor includes: an interpolation part that color interpolates a digital image signal inputted from the sensor unit so that all the pixels of a pixel array each has red, green and blue components; a lens shading compensation part that analyzes luminance information on red, green and blue colors of all the pixels of the pixel array, which are color interpolated by the interpolation part, according to color, measures the luminance of a portion having a predetermined size and positioned around a first central pixel of the pixel array, sets the luminance of the portion as an auto exposure value, detects a second central pixel in a lens shading image corresponding to the luminance information, partitions pixels in units of block according to the distance from the second central pixel, generates a compensation value per block corresponding to the auto exposure value, saves the compensation value per block as a compensation table, calculates a distance between an object pixel and the second central pixel, computes a compensation value for an object pixel by using the compensation value per block corresponding to the distance between an object pixel and the second central pixel, thereby producing a shading mask image for each color, and generates and outputs pixel compensation information by combining the shading mask image with the luminance information; and a subsequent processing part processing the pixel compensation information to be displayed through the display unit.

The second central pixel is detected by using intersection points on a closed curve, the closed curve being produced by a luminance boundary value set to be located between a minimum value and a maximum value of the luminance information on each pixel of the pixel array, the closed curve being intersected by a horizontal central line or a vertical central line both passing through the first central pixel at the intersection points.

The compensation value per block is determined by partitioning the pixels in units of block according to the distance from the second central pixel, and continuing to apply a different compensation value to the pixels included in the block until a compensation value, where the largest number of pixels have a value between an upper auto exposure limit and a lower auto exposure limit, is founded, the upper auto exposure limit and the lower auto exposure limit being set so that the auto exposure value is positioned therebetween.

The lens shading compensation part detects a slope of the lens shading image that is tilted in a direction, produces a tilted mask image to compensate the slope, and generates the pixel compensation information by combining the luminance information with the tilted mask image.

In another embodiment of the present invention, a method for compensating a lens shading phenomenon in an image sensor includes: (a) generating luminance information from primitive image data that has been color interpolated so that each pixel has red, green and blue color components, for each color; (b) measuring an average luminance of a portion having a predetermined size and positioned around a first central pixel of the pixel array through the luminance information and setting the average luminance of the portion as an auto exposure value; (c) detecting a second central pixel from a lens shading image corresponding to the luminance information; (d) partitioning pixels in units of block according to the distance from the second central pixel, generating and saving a compensation value per block corresponding to the auto exposure value; (e) calculating a distance between an object pixel and the second central pixel; (f) producing a compensation value for the object pixel by using the compensation value per block corresponding to the distance between the object pixel and the second central pixel, and creating a shading mask image for each color; and (g) generating pixel compensation information by combining the primitive image data with the shading mask image and outputting the compensation pixel information.

The step (c) includes: setting a boundary luminance value to be located between a minimum value and a maximum value of the luminance information on each pixel of the pixel array; detecting intersection pixels of a horizontal central line or a vertical central line both passing through the first central pixel and a closed curve produced by the luminance boundary value; and detecting the second central pixel by using the intersection pixels.

The step (b) further comprising setting an upper exposure limit and a lower exposure limit such that the auto exposure value is located therebetween.

The step (d) includes: (d-1) partitioning the pixels in units of block according to the distance from the second central pixel; (d-2) applying an arbitrary compensation value to the pixels included in the block, and counting the number of the pixels having a value between the upper auto exposure limit and the lower auto exposure limit; and (d-3) saving a compensation value, at which the counted number is the largest, as a compensation value of the block, wherein the steps (d-1) through (d-3) are repeatedly performed for the entire area of the primitive image data.

The above method further includes detecting a slope of the lens shading image, which is tilted in a directions between the step (b) and the step (c).

The above method further includes producing a tilted mask image to compensate the slope between the step (f) and the step (g), wherein the step (g) generates the pixel compensation information by combining the shading mask image and the tilted mask image with the primitive image data.

DETAILED DESCRIPTION

Hereinafter, embodiments of the present invention will be described in detail with reference to the accompanying drawings.

The descriptions set forth below merely illustrate the principles of the present invention. Therefore, those skilled in the art could devise various methods and apparatus thereof which realize the principles of the present invention and which do not depart from the spirit and scope of the present invention, even though they may not be clearly explained or illustrated in the present specification. Also, it is to be appreciated that not only the principles, viewpoints, and embodiments of the present invention, but all detailed descriptions listing the particular embodiments are intended to include structural and functional equivalents.

Terms used in the description (for example, a first, a second, etc.) are merely used to distinguish equal or similar items in an ordinal manner.

Also, the terms used in the description are merely used to describe the following embodiments, but not to limit the invention. Unless clearly used otherwise, expressions in the singular number include a plural meaning. In this application, the terms "included" and "stored" intend to express the existence of the characteristic, the numeral, the step, the operation, the element, the part, or the combination thereof, and do not intend to exclude another characteristic, numeral, step, operation, element, part, or any combination thereof, or any addition thereto.

Unless defined otherwise, the terms used herein including technological or scientific terms have the same meaning that is generally understood by those ordinarily skilled in the art to which the invention pertains. The terms used herein shall not be interpreted not only based on the definition of any dictionary but also the meaning that is used in the field to which the invention pertains. Also, unless clearly defined, the terms used herein shall not be interpreted too ideally or formally.

In the present invention, a white blank image is photographed in order for all the pixels of a pixel array to have a uniform brightness.

Figure 1:
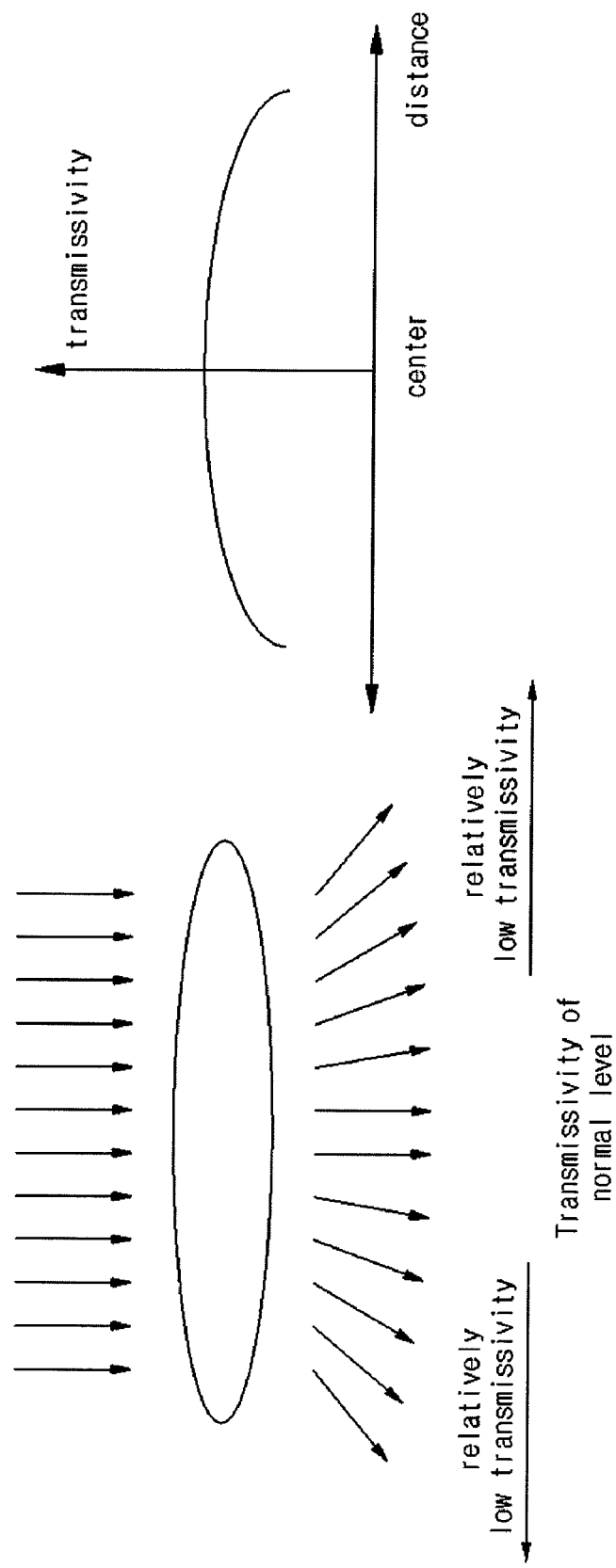
FIG. 1 illustrates a disparity in transmissivity between the central part and the periphery of a lens.
Figure 2:
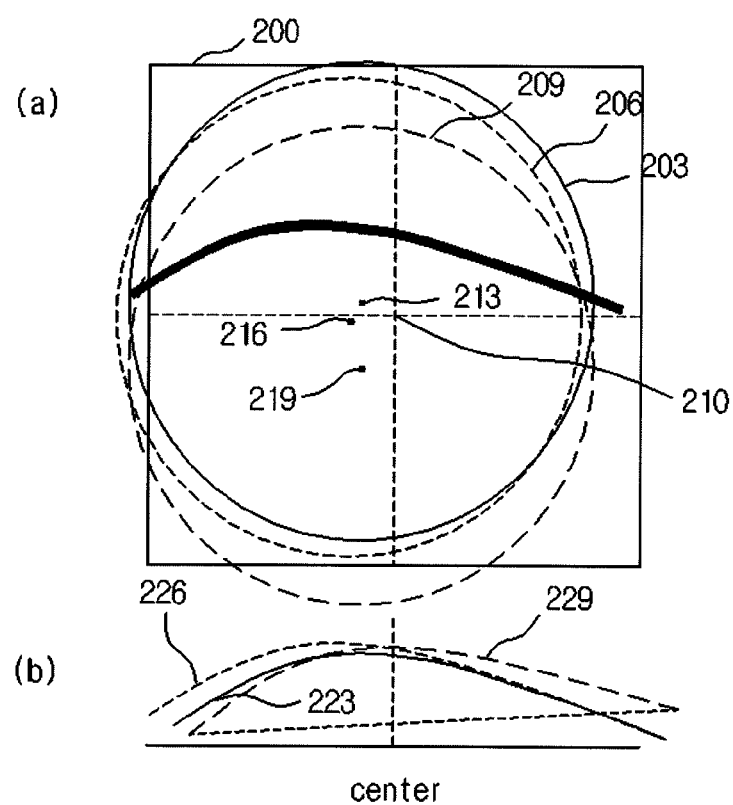
FIGS. 2(a) and 2(b) are diagrams illustrating lens shading images each generated from red (R), green (G) and blue (B) lights.
Figure 3:
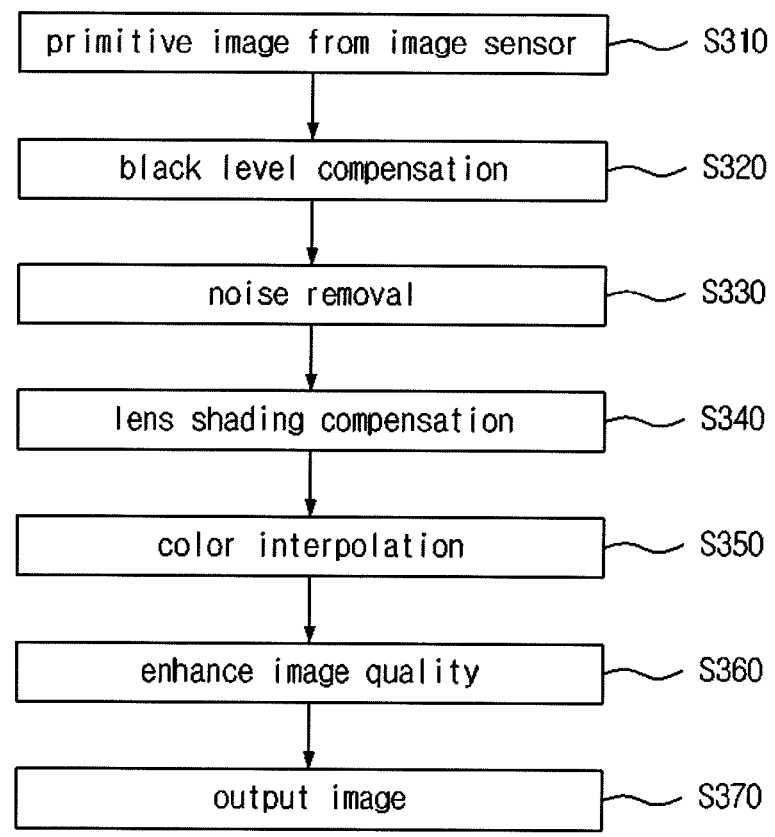
FIG. 3 is a flow chart showing a conventional image processing method for making the brightness uniform.
Figure 4:
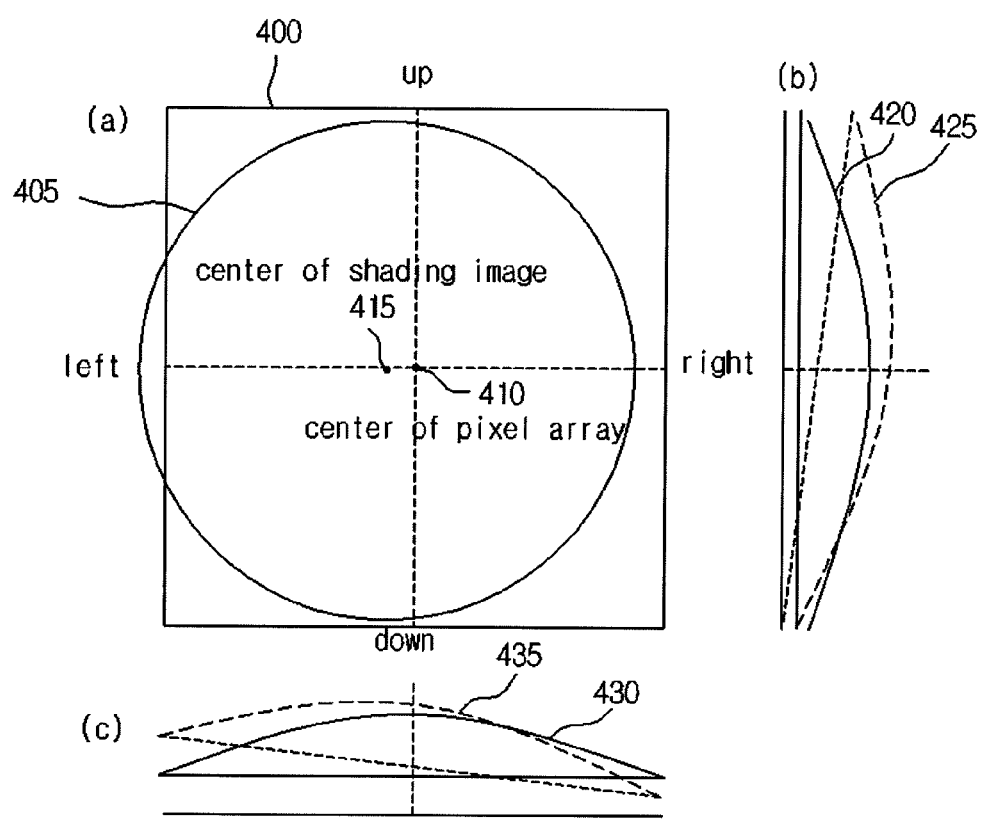
FIGS. 4(a), 4(b), and 4(c) illustrate lens shading images of another embodiment.
Figure 5:
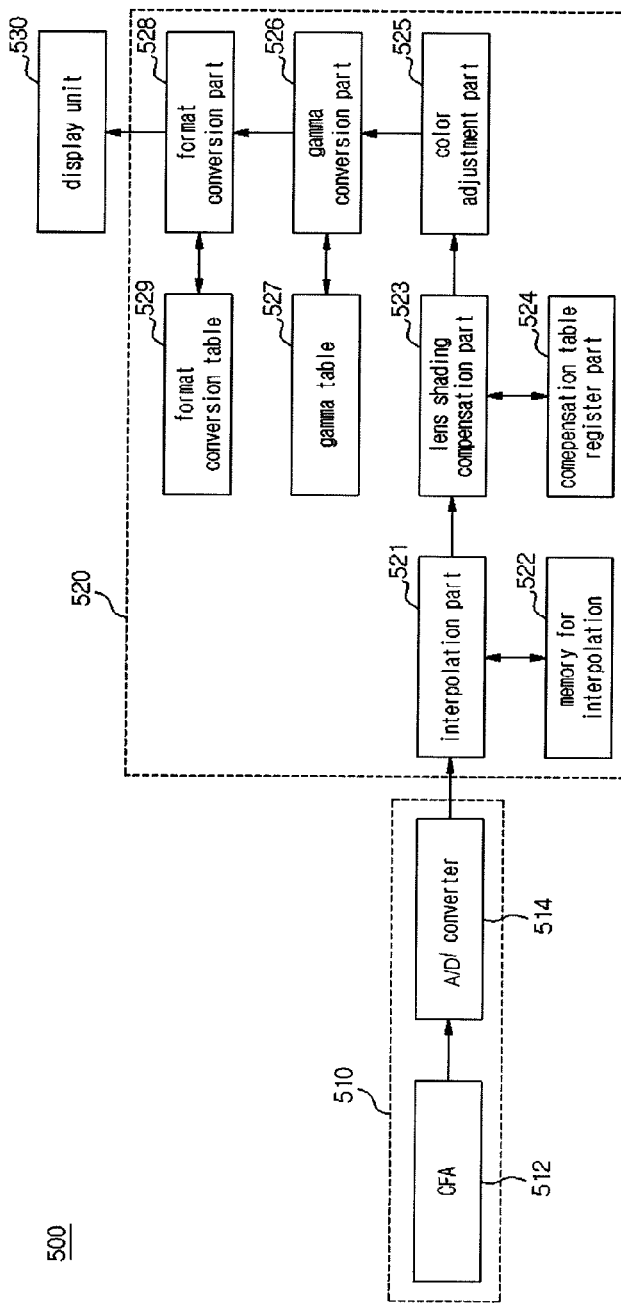
FIG. 5 is a block diagram of an image processing device according to an embodiment of the present invention.

FIG. 5 is a block diagram showing the structure of an image processing apparatus according to an embodiment of the present invention. Referring to FIG. 5, the image processing apparatus 500 includes a sensor unit 510, an image processing unit 520, and a display unit 530. Besides, a key input unit, a memory, etc. can also be included, but descriptions on them are omitted since they are irrelevant to the gist of the present invention.

The sensor unit 510 includes a color filter array (CFA) 512 and an A/D converter 514. The sensor unit 510 may further include a lens (not shown).

The color filter array 512 converts optical signals inputted through the lens into electrical signals, and outputs the electrical signals. At this time, the color filter array 512 can use a variety of patterns such as, for example a Bayer pattern, and an image signal containing chromatic information on only one of red, green and blue colors is outputted to each pixel.

An image signal containing information on red color is outputted from the pixel corresponding to an R (red) pattern, an image signal containing information on green color is outputted from the pixel corresponding to a G (green) pattern, and an image signal containing information on blue color is outputted from the pixel corresponding to a B (blue) pattern.

Each pixel value obtained through the color filter array 512 having the Bayer pattern, etc. is interpolated (for example, deficit chromatic information can be inferred by averaging to pixel values of right and left sides, or four pixel values of neighboring four sides) to obtain complete chromatic information. Such an interpolation is conducted in an interpolation part 521.

The A/D converter 514 converts an image signal converted by the color filter array 512 into a digital signal, and sends the digital signal to the interpolation part 521.

The image processing unit 520 includes the interpolation part 521, a memory for interpolation 522, a lens shading compensation part 523, a compensation table register part 524, a color adjustment part 525, a gamma conversion part 526, a gamma table 527, a format conversion part 528, and a format conversion table 529. The image processing unit 520 may further include a timing generating part (not shown) that generates a variety of timing signals out of a horizontal synchronizing signal (Hsync), a vertical synchronizing signal (Vsync), and a pixel clock (PCLK).

The interpolation part 521 generates pixel signals of red, green and blue colors for each pixel. When an image signal outputted from the color filter array 512 has the Bayer pattern, the pixel signals of green or blue cannot be obtained from the pixel corresponding to red color. Consequently, the interpolation part 521 generates the pixel signals of green and blue for the pixel corresponding to red color by performing an interpolating operation.

For this, the pixel signals of neighboring pixels are temporarily saved in the memory for interpolation 522, so that the interpolation part 521 uses these recorded pixel signals to perform the interpolating operation.

The lens shading compensation part 523 analyzes the luminance and level of the pixel signals for each pixel, detects a central pixel and a slope of the lens shading image, and produces a mask image that can compensate the lens shading phenomenon, in accordance with a predetermined process.

The compensation through the level analysis, lens shading image central pixel detection and slope detection is accomplished by setting an auto exposure value. The level relates to the luminance of each pixel, and, for example, when the levels of the pixels are all 10, the overall brightness of the picture can be said to be 10.

As described above, the lens shading compensation part 523 compensates image signals of all the pixels in the pixel array corresponding to one frame, namely, the pixel signals containing information on red, green and blue colors, in accordance with the level set by setting the auto exposure value, thereby keeping the quality of a primitive image from deteriorating. The composition and functions of the lens shading compensation part 523 will be described in detail with reference to FIG. 6.

The compensation table is generated from luminance components and is generated based on the central pixel and/or the slope of the lens shading image. One compensation table may be generated for each of red, green and blue colors. This compensation table is saved in the compensation table register part 524. The compensation table is composed of an N number of blocks each having an equal width (e.g. 16 pixels, 32 pixels, 64 pixels, etc.) and formed along the distance from the central pixel of the shading image, and an N number of luminance values corresponding to the blocks.

The wider the width of the block is, the larger the difference in compensation values between its boundaries becomes, lowering the accuracy of the compensation. In case of using the block in 16 pixels, it allows precise lens shading compensation but requires many number of registers, so that the block in 32 pixels is generally used. In addition, the block is formed in pixels in order to conduct a shift operation that allows omitting a dividing operation, during the lens shading compensation.

The color adjustment part 525 adjusts color tone, and the gamma conversion part 526 converts image data to be appropriate for device characteristics (gamma characteristics) for output to the display unit (e.g., an LCD, a CRT) 530. In the gamma table 527 is stored a conversion table used for conversion to gamma characteristics.

As a means to convert pixel signals to have a format appropriate for the display unit 530, the format conversion part 528 converts pixel signals to have a digital format such as NTSC, YUV, YCbCr, etc., and outputs them. The format conversion table 529 is a table for conversion to display signal formats such as NTSC or TUV, etc.

Figure 6:
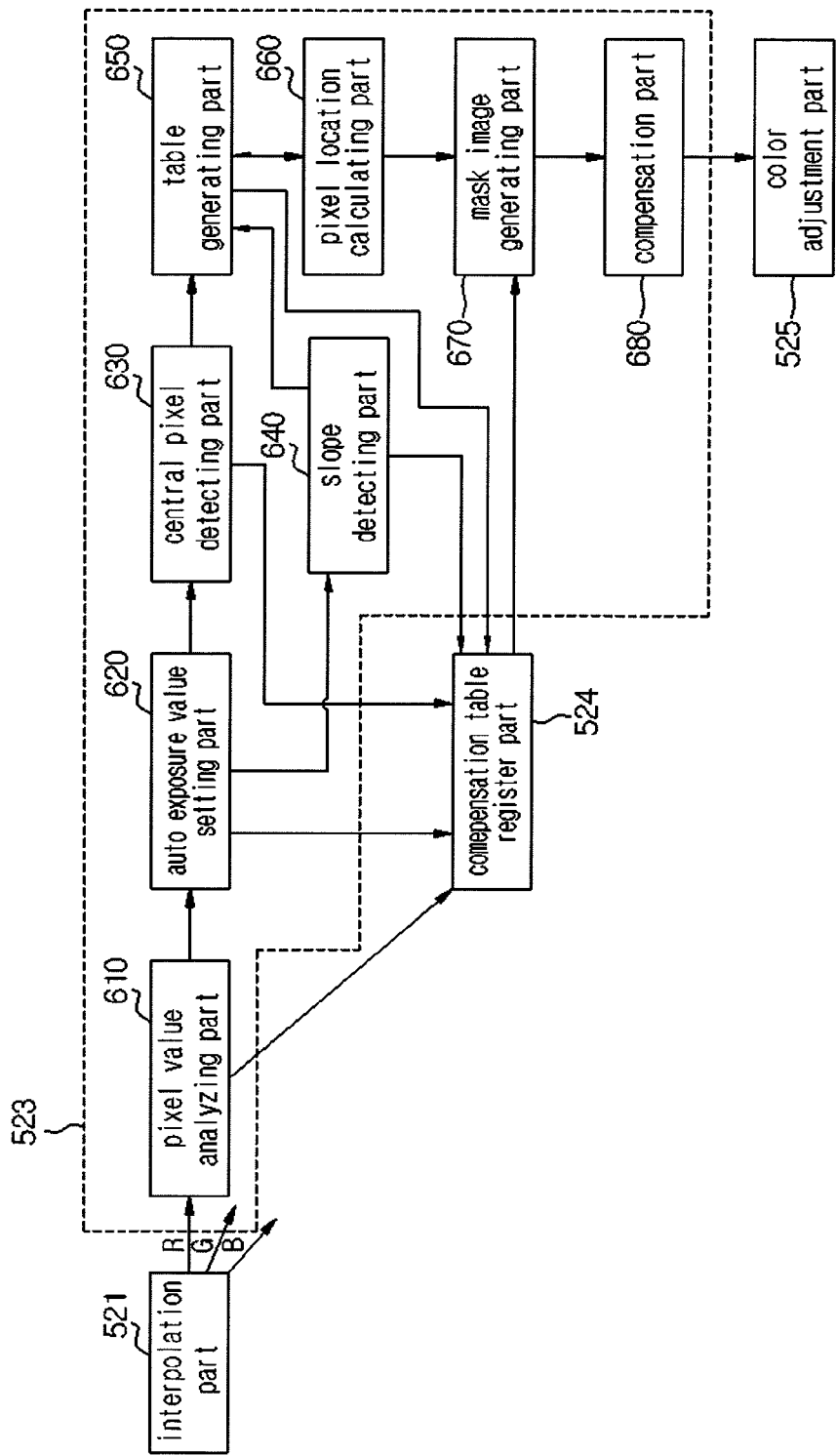
FIG. 6 is a block diagram showing the structure of a lens shading compensation part in detail according to an embodiment of the present invention.
Figure 7:
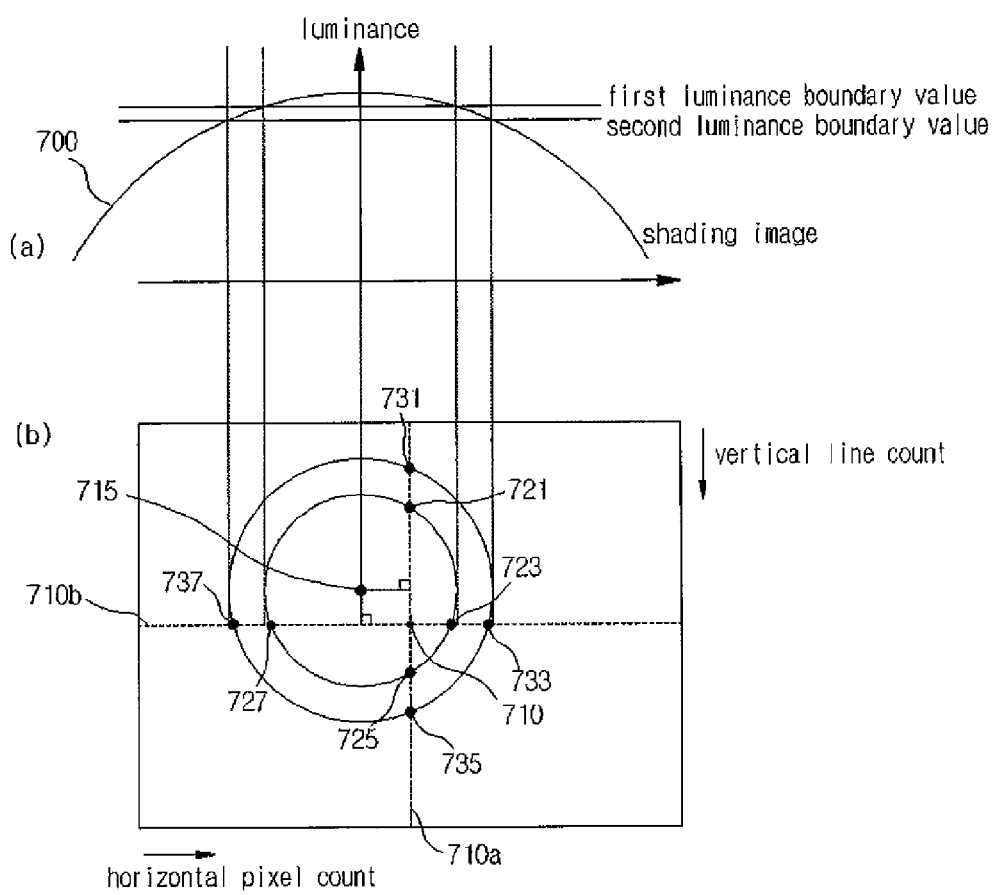
FIGS. 7(a) and 7(b) illustrate a method for detecting the central pixel of a lens shading image according to an embodiment of the present invention.
Figure 8:
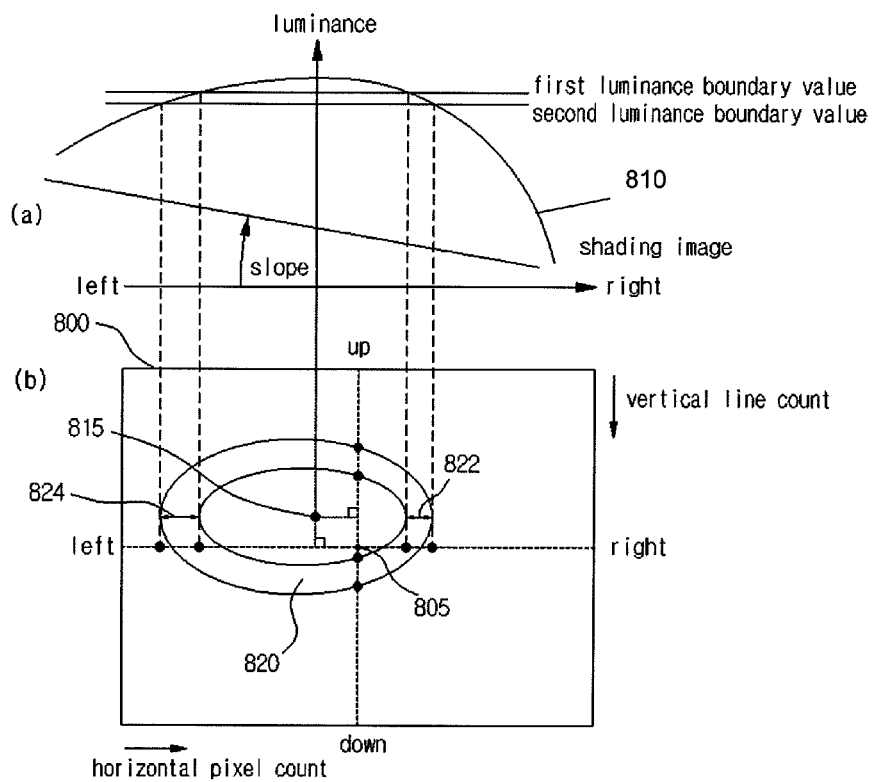
FIGS. 8(a) and 8(b) are diagrams illustrating a method for detecting a slope of a lens shading image according to an embodiment of the present invention.
Figure 9:
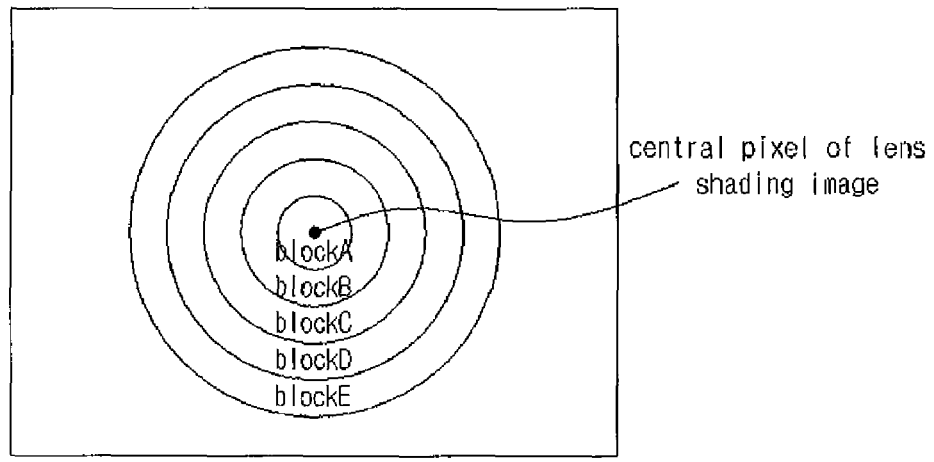
FIG. 9 illustrates a method for producing a compensation table according to an embodiment of the present invention.
Figure 9:
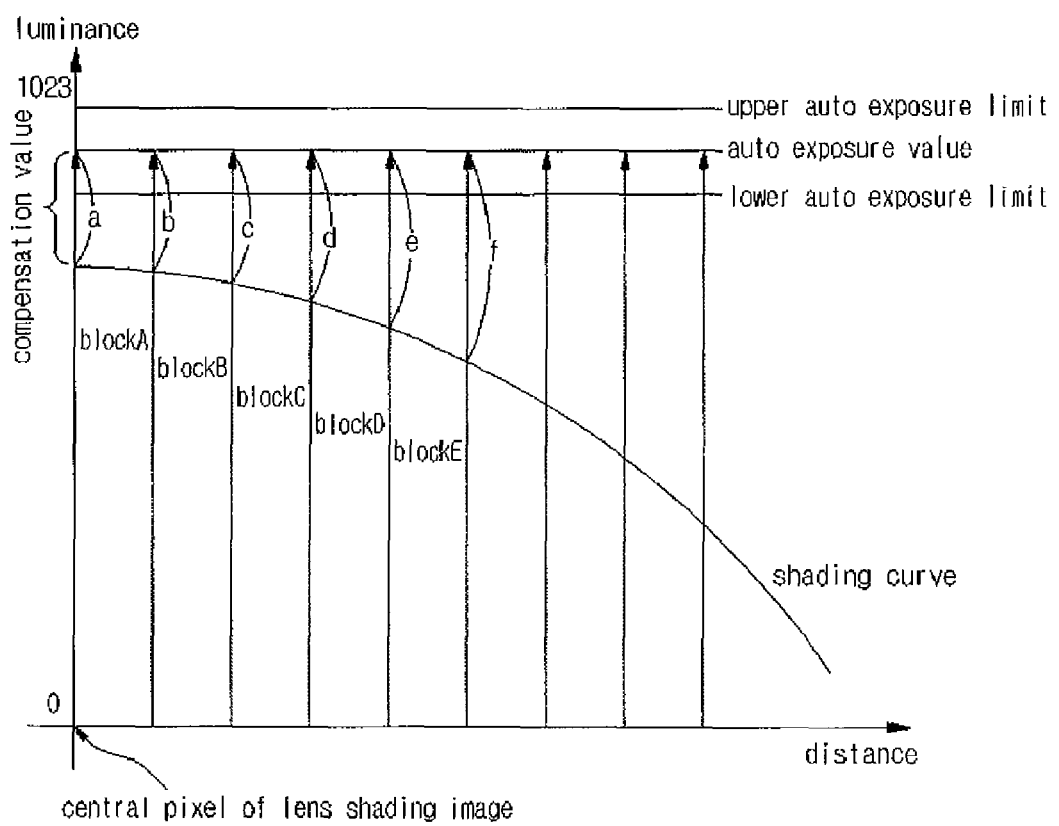
Figure 10:
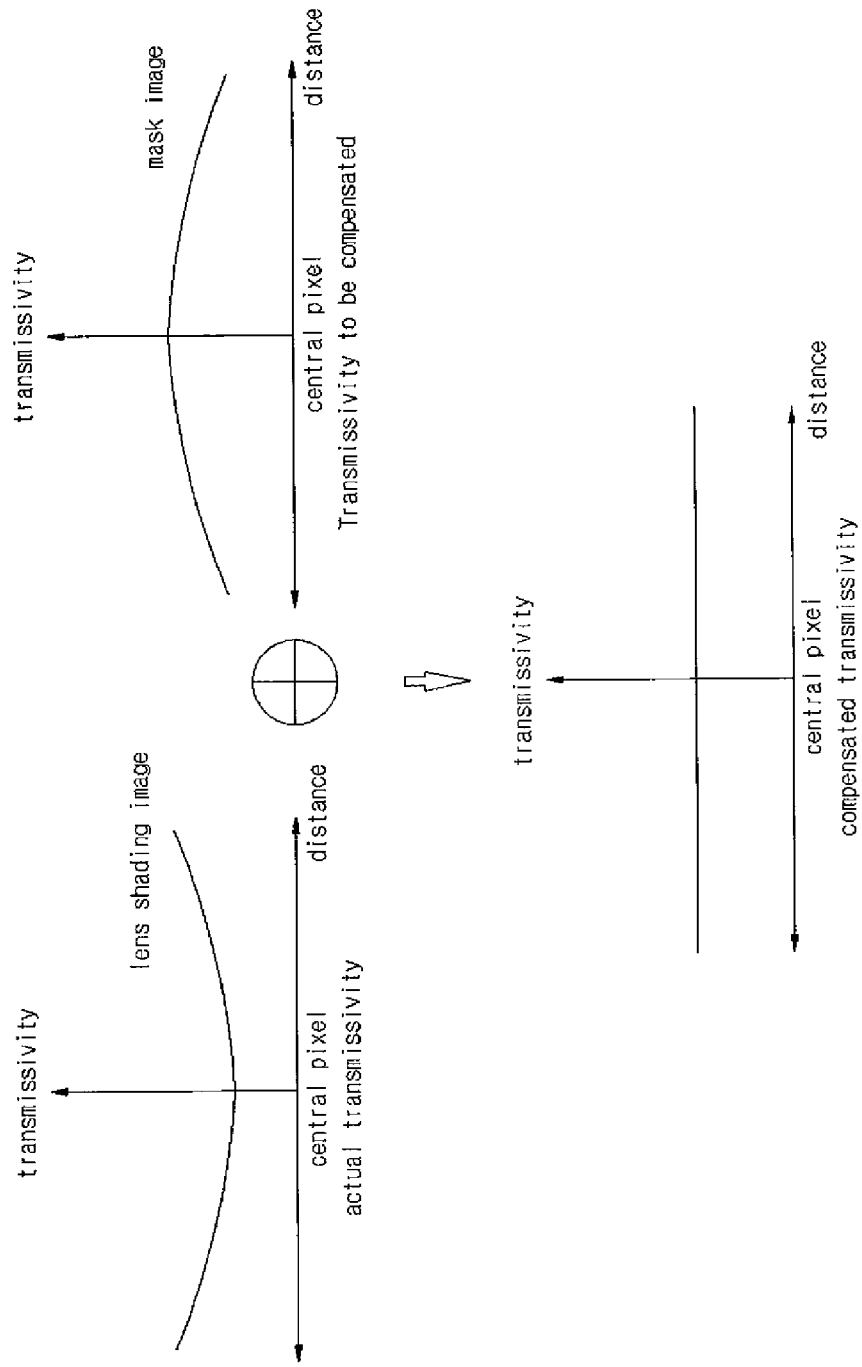
FIG. 10 illustrates a method for leveling the transmissivity by compensating a lens shading phenomenon with a mask image.

FIG. 6 is a block diagram showing the structure of a lens shading compensation part according to an embodiment of the present invention. FIGS. 7(*a*) and 7(*b*) are diagrams illustrating a method of detecting the central pixel of a lens shading image according to an embodiment of the present invention. FIGS. 8(*a*) and 8(*b*) are diagrams illustrating a method of detecting a slope of a lens shading image according to an embodiment of the present invention. FIG. 9 illustrates a method of generating a compensation table according to an embodiment of the present invention. FIG. 10 illustrates a method of equalizing the transmissivity by compensating a lens shading phenomenon with a mask image.

The lens shading compensation part 523 generates a lens shading image for each of red, green and blue colors by using image data color interpolated through the interpolation part 521 to have pixel signals containing information on red, green and blue colors with respect to all the pixels, and generates a mask image to compensate this lens shading image.

Even if different lens shading compensation parts 523 are formed for each of red, green and blue colors, hardware resources do not increase substantially since common elements can be shared.

While the description below concentrates on compensating a lens shading phenomenon occurred in a lens shading image formed by red color components of the pixels, it can also be applied to the lens shading image formed by green or blue components.

Referring to FIG. 6, the lens shading compensation part 523 includes a pixel value analyzing part 610, an auto exposure value setting part 620, a central pixel detecting part 630, a slope detecting unit 640, a table generating part 650, a pixel location calculating part 660, a mask image generating part 670, and a compensation part 680.

The pixel value analyzing part 610 receives image data, which is composed of digital image signals color interpolated by the interpolation part 521, and analyzes luminance information and level information of each pixel. The pixel value analyzing part 610 can perform the analysis of the image data line by line, or for an entire frame, or for only a central line through sampling. It is obvious that the pixel value analyzing part 610 may perform the analysis in a different manner in correspondence with bit information (e.g. 10 bits, 8 bits) of the image signal.

The auto exposure value setting part 620 selects the area of a predetermined size (e.g. an area composed of 200×200 pixels) from the central area of the pixel array of the image, and sets an average luminance of the selected area as an auto exposure value. The auto exposure value is positioned between an auto exposure upper limit and an auto exposure lower limit. Here, the auto exposure upper limit and auto exposure lower limit are arbitrary two luminance values selected from the luminance graph of the lens shading image, and are used by the central pixel detecting part 630 to detect the central pixel of the lens shading image. The gap between the auto exposure upper limit and the auto exposure lower limit can be predetermined or set by a user.

By using the auto exposure value, the luminance of the center of the pixel array is fixed, so that the luminance of other areas other than the center is adjusted based thereon. In other words, the auto exposure value is a target value that is to be achieved through compensating. Such an auto exposure value is stored in the compensation table register part 524 to be used when the table generating part 650 generates a compensation table.

The central pixel detecting part 630 detects the central pixel of the lens shading image from a white blank image, so that the compensation can be performed based on the center of the lens shading image in case the center of the pixel array does not coincide therewith. When the central pixel of the lens shading image is detected, the location thereof is stored in the compensation table register part 524, so that a mask image for compensating the lens shading phenomenon is generated based on the central pixel.

The following describes a method for detecting the central pixel of the lens shading image with reference to FIG. 7. The central pixel detecting part 630 sets a first luminance boundary value to be lower than that of the highest luminance value and a second luminance boundary value to be higher than that of the lowest luminance value of the luminance information on all the pixels, so that the first and the second luminance boundary values are determined. Here, the first luminance boundary value is larger than the second luminance boundary value.

The pixels, of which luminance is between the first and the second luminance boundary values, are mapped into a first preset value (e.g. '225'), and other pixels are mapped into a second preset value (e.g. '0'). The pixels mapped into the first value form two concentric circles or two ellipses as shown in FIG. 7(b).

Two concentric circles tell that the lens shading image is not inclined neither horizontally nor vertically, and two ellipses tell that the lens shading image is inclined in a particular direction. The latter case will be described later when describing the slope detecting part 640. The description below focuses on the case where the lens shading image has no slope.

A circular band is formed of pixels, of which luminance values are between the first and the second luminance values, and has 8 intersection points 721, 723, 725, 727, 731, 733, 735, 737 where a vertical central line 710a and a horizontal central line 710b of the pixel array intersect the inner and outer boundaries of the circular band. Here, the vertical central line 710a and the horizontal central line 710b are determined in advance.

The inner boundary of the circular band intersects the vertical central line 710a at two points 721 and 725, forming a chord 721-725 and also intersects the horizontal central line 710b at two points 723 and 727, forming another chord 723-727. The intersection point of the perpendicular bisectors of the two chords is the central pixel 715 of the lens shading image 700. This is based on the theorem that the perpendicular bisectors of two chords of a circle pass through the center of the circle. This is also true for the outer boundary of the circular band.

Of course, other various methods can be applied to detect the central pixel of the lens shading image. Detecting the central pixel 715 of the lens shading image is important in that when the central pixel of the lens shading image is not properly compensated, chromatic aberration occurs causing color fringes around the image.

In case the lens shading image has a slope, the slope detecting part 640 detects the slope to compensate it. A method for detecting the slope of the lens shading image 810 is described below with reference to FIG. 8.

When a pixel band, composed of pixels having luminance values belonging to a certain luminance level, does not form two co-centric circles, it indicates that the lens shading image 810 has a slope into a particular direction.

The lens shading image 810 illustrated in FIG. 8(a) has a slope declining from left to right. In this case, the lens shading image 810 is brighter in its left side than its right side. Accordingly, a mask image that has a slope that can compensate such a luminance difference is produced. The slope can be obtained from the luminance deviation between the right and left and the distance from a central pixel 815 of the lens shading image 810.

First and second luminance limits are set in a similar manner as the central pixel detecting part 630 detected the central pixel of the lens shading image to detect a pixel band 820 as shown in FIG. 8(b) that depicts a center point 805 of a pixel array 800. The width of the pixel band 820 is wider in its left width 824 than its right width 822, indicating that the lens shading image is declining to its right. The slope can be calculated from the left width 824 and the right width 822 in order to produce a mask image for compensating the slope.

Although not shown in FIG. 8, a slope inclining in another direction can be detected in the same manner and a mask image can be produced according thereto.

The table generating part 650 generates a compensation table out of luminance information (e.g. luminance information and level value on each of the pixels) analyzed in the pixel value analyzing part 610, an auto exposure value and an auto exposure upper limit and an auto exposure lower limit set by the auto exposure value setting part 620, the location of the central pixel of the lens shading image detected by the central pixel detecting part 630 and/or a slope of the lens shading image detected by the slope detecting part 640, and stores the compensation table in the compensation table register part 524.

In case the slope detecting part 640 detects a slope of the lens shading image, the slope may first be compensated to form a new lens shading image having no slope before generating a compensation table.

Referring to FIG. 9, the pixels of the lens shading image are partitioned off in units of block according to the distance from the central pixel of the lens shading image to another pixel, so that a compensation value per block is generated (e.g., starting and ending locations of a certain block).

In order to generate the compensation value per block is counted the number of pixels within a unit block that have a value between the auto exposure upper limit and the auto exposure lower limit. The change in the number of pixels within the unit block, which have a value between the auto exposure upper limit and the auto exposure lower limit (a tuning range), is monitored in accordance with an increase or decrease of the compensation value, so that the compensation value corresponding to the largest number of pixels is finally determined as an compensation value for the unit block.

In case of a block A of FIG. 9, initially, there was no pixel having a value within the tuning range, but almost all the pixels in the block A can have a value within the tuning range when a compensation value 'a' is added. This process is performed repeatedly for the rest blocks to determine a compensation value for each block. It is obvious that the compensation value can be a negative value when the auto exposure value is lower than the luminance value of the central pixel of the shading image.

An error test can be conducted before storing the compensation table in the compensation table register part 524. The lens shading image has a convex parabola surface with an axis of the central pixel of the lens shading image. Accordingly, the compensation value is supposed to form a concave parabola. Therefore, it detects if (1) a compensation value of a certain block is abnormally larger than that of its preceding block (e.g., if it is 100 or higher), or (2) a compensation value for a certain block is smaller than that of its preceding block (for example, the case where the compensation value 'd' for the block D is smaller than the compensation value 'c' for the block C). If the results meet the above conditions, it is concluded that the compensation table is erroneous, so that the compensation table should be regenerated.

The pixel location calculating part 660 calculates the distance between the central pixel of the lens shading image detected by the central pixel detecting part 630 and another pixel. For example, the compensation part 523 counts image signals inputted from the horizontal and vertical directions in accordance with their input order (for example, the counting can be conducted by the pixel value analyzing part 610 or by a separate counting means), and the counted number indicates the location of the corresponding pixel in the lens shading image can be known from the counted number by referring to a pre-established table. Consequently, the pixel location calculating part 660 can calculate the distance between each pixel and the central pixel of the lens shading image which is then, so that the pixels can be partitioned off grouped as a unit block (refer to FIG. 9).

Also, the counted number allows the compensation value stored in the compensation table register part 524 to be associated with each pixel.

The mask image generating part 670 computes a compensation value for a certain pixel by extracting the compensation value stored in the compensation table register part 524 in correspondence with the counted number. The compensation table stored in the compensation table register part 524 is configured to correspond to the unit block of the pixel array (e.g. 16 pixels, 32 pixels, 64 pixels). The compensation values within a unit block can be computed by using two table values (for example, a first compensation value corresponding to the starting location of the block and a second compensation value corresponding to the ending location of the block).

Generally, the location of an object pixel is relatively determined with respect to the starting and ending location of a block to which the pixel belongs, and the two compensation values corresponding to the two points are linearly interpolated to find out a compensation value corresponding to the location. Other various methods can also be applied to analogize the compensation value for each of the pixels.

After compensation values are analogized for all the pixels, a mask image that can compensate the lens shading phenomenon is generated.

In case the slope detecting part 640 detects a slope of the lens shading image, a tilted mask image is additionally generated to compensate a shading mask image, creating a complete mask image.

The compensation part 680 generates pixel compensation information by combining primitive image data and the mask image, which is the combination of the tilted mask image and the shading mask image, and delivers the pixel compensation information to the color adjustment part 525 (refer to FIG. 10).

Figure 11:
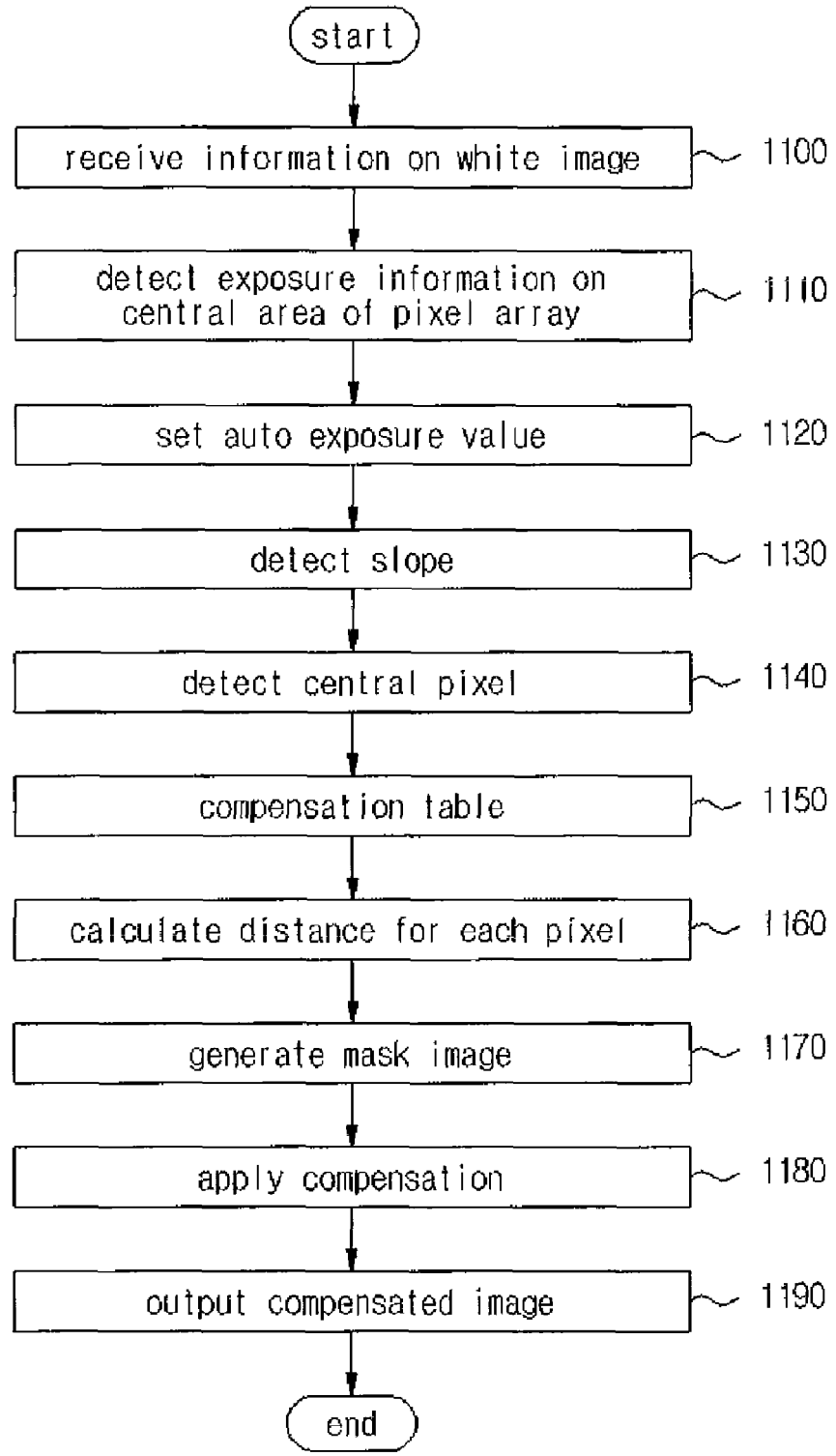
FIG. 11 is a flow chart of a method for compensating a lens shading phenomenon according to an embodiment of the present invention.

FIG. 11 is a flow chart of a method for compensating a lens shading phenomenon in accordance with an embodiment of the present invention. Referring to FIG. 11, at step S1100, the pixel value analyzing part 610 receives interpolated image data from the interpolation part 521, which conducts a color interpolation on digital image signals corresponding to a primitive a white image that is a photographed image of a white area. Here, due to the geometrical properties of the lens, the lens shading phenomenon occurs in the primitive white image, so that the farther away from the center of the primitive white image, the less luminous it becomes The pixel value analyzing part 610 generates luminance information for each pixel.

At step S1110, the auto exposure value setting part 620 measures the average luminance of a predetermined area around the central pixel of the pixel array, by using digital image signals inputted per line. Subsequently, at step S1120, the auto exposure value setting part 620 set the average luminance, measured at step S1110, as an auto exposure value. Furthermore, an exposure upper limit and an exposure lower limit are decided such that the auto exposure value is positioned between the upper exposure limit and lower exposure limit.

At step S1130, the slope detecting part 640 detects a slope of the lens shading image, in case the lens shading image has one.

At step S1140, the central pixel detecting part 630 detects the central pixel of the lens shading image from the image data, as shown in FIGS. 7 and 8.

At step S1150, the table generating part 650 generates a compensation value for each pixel (or each block) by using the luminance information, the auto exposure value, the central pixel of the lens shading image, the slope, and the distance between the central pixel of the lens shading image and each pixel (it can be partitioned as a block). Then, the generated compensation value and/or the luminance information, the auto exposure value, the central pixel of the lens shading image, and the distance between the central pixel and each block are stored in the compensation table register part 524.

At step S1160, the pixel location calculating part 660 calculates the distance between the central pixel and each pixel by using the counted number that indicates the location of each pixel.

At step S1170, the mask image generating part 670 extracts the compensation table stored in the compensation table register part 524 to compute a compensation value for a corresponding pixel. After all the computation values are computed, a mask image is generated.

At step S1180, the compensation part 680 couples the lens shading image produced out of the luminance information of step S1100 with the mask image of step S1170, and generates pixel compensation information. The compensation part 680 proceeds to step S1190 to deliver the pixel compensation information to the color adjustment part 525.

The lens shading compensation method described above can be individually performed for red, green and blue colors, so that a lens shading image and a mask image can be generated for each color component of image data, which has been color interpolated by the interpolation part 521 to have red, green and blue components.

An image processor, a lens shading compensation apparatus, and a lens shading compensation method according to the present invention conduct a color interpolation for each of red, green and blue colors, and compensate a lens shading phenomenon in a lens shading image for each color.

Also, with the image processor, the lens shading compensation apparatus, and the lens shading compensation method, a lens shading phenomenon can be analyzed and compensated with no consideration for other colors or interruption from other colors.

Also, with the image processor, the lens shading compensation apparatus, and the lens shading compensation method, a lens shading image having a slope can be compensated.

Even though the present invention individually analyzes and performs lens shading compensation for each color, it does not increase hardware resource substantially because it can share common hardware.

While the invention has been described with reference to the disclosed embodiments, it is to be appreciated that those skilled in the art can change or modify the embodiments without departing from the scope and spirit of the invention or its equivalents as stated below in the claims.

What is claimed is:

1. A lens shading compensation apparatus comprising:
a pixel value analyzing part generating luminance information from primitive image data, the primitive image data being color interpolated so that each pixel has red, green and blue components, the luminance information being generated for each color;
an auto exposure value setting part measuring an average luminance of a portion of a pixel array through the luminance information and setting the average luminance as an auto exposure value, the portion of the pixel array being positioned around a first central pixel of the pixel array;
a central pixel detecting part detecting a second central pixel from a lens shading image corresponding to the luminance information;
a table generating part partitioning the pixels in units of blocks according to the distance from the second central pixel, generating and storing a compensation value per block corresponding to the auto exposure value;
a pixel location calculating part calculating the distance between an object pixel and the second central pixel;
a mask image generating part producing a compensation value for the object pixel by using the compensation value per block corresponding to the distance between the object pixel and the second central pixel, and creating a shading mask image per color; and
a compensation part generating pixel compensation information by combining the primitive image data with the shading mask image,
wherein the central pixel detecting part detects the second central pixel by using intersection points on a closed curve, the curve being produced by a luminance boundary value, the luminance boundary value set to be located between a minimum value and a maximum value of the luminance information on each pixel of the pixel array, the closed curve being intersected by a horizontal central line or a vertical central line both passing through the first central pixel at the intersection points.

2. The lens shading compensation apparatus of claim 1, wherein the auto exposure value setting part sets an upper auto exposure limit and a lower auto exposure limit such that the auto exposure value is positioned therebetween.

3. The lens shading compensation apparatus of claim 2, wherein the table generating part partitions the pixels in units of blocks according to the distance from the second central pixel, and continues to apply a different compensation value to the pixels included in the block until it finds a compensation value, at which the largest number of pixels have a value between the upper auto exposure limit and the lower auto exposure limit, and stores the compensation value as the compensation value per block.

4. The lens shading compensation apparatus of claim 1, further comprising a slope detecting part that detects a slope of the lens shading image.

5. The lens shading compensation apparatus of claim 4, wherein the mask image generating part generates a tilted mask image to compensate the slope, and the compensation part produces the pixel compensation information by combining the shading mask image and the tilted mask image with the primitive image data.

6. An image processor of an image apparatus compensating a lens shading phenomenon-wherein the image apparatus comprises a sensor unit, the image processor and a display unit-, the image processor comprising:

an interpolation part that color interpolates a digital image signal inputted from the sensor unit so that all the pixels of a pixel array each has red, green and blue components;
a lens shading compensation part that analyzes luminance information on red, green and blue colors of all the pixels of the pixel array, which are color interpolated by the interpolation part, according to color, measures the luminance of a portion of the pixel array having a predetermined size and positioned around a first central pixel of the pixel array, sets the luminance of the portion as an auto exposure value,
detects a second central pixel in a lens shading image corresponding to the luminance information, partitions pixels in units of blocks according to the distance from the second central pixel, generates a compensation value per block corresponding to the auto exposure value, saves the compensation value per block as a compensation table,
calculates a distance between an object pixel and the second central pixel, computes a compensation value for an object pixel by using the compensation value per block corresponding to the distance between an object pixel and the second central pixel, thereby producing a shading mask image for each color, and generates and outputs pixel compensation information by combining the shading mask image with the luminance information; and
a subsequent processing part processing the pixel compensation information to be displayed through the display unit,
wherein the second central pixel is detected by using intersection points on a closed curve, the closed curve being produced by a luminance boundary value set to be located between a minimum value and a maximum value of the luminance information on each pixel of the pixel array, the closed curve being intersected by a horizontal central line or a vertical central line both passing through the first central pixel at the intersection points.

7. The image processor of claim 6, wherein the compensation value per block is determined by partitioning the pixels in units of blocks according to the distance from the second central pixel, and continuing to apply a different compensation value to the pixels included in the block until a compensation value, where the largest number of pixels have a value between an upper auto exposure limit and a lower auto exposure limit, is founded, the upper auto exposure limit and the lower auto exposure limit being set so that the auto exposure value is positioned therebetween.

8. The image processor of claim 6, wherein the lens shading compensation part detects a slope of the lens shading image that is tilted in a direction, produces a tilted mask image to compensate the slope, and generates the pixel compensation information by combining the luminance information with the tilted mask image and the shading mask image.

9. A method for compensating a lens shading phenomenon in an image sensor, the method comprising:
(a) generating luminance information from primitive image data that has been color interpolated so that each pixel has red, green and blue color components, for each color;
(b) measuring an average luminance of a portion having a predetermined size and positioned around a first central pixel of the pixel array through the luminance information and setting the average luminance of the portion as an auto exposure value;
(c) detecting a second central pixel from a lens shading image corresponding to the luminance information;

(d) partitioning pixels in units of blocks according to the distance from the second central pixel, generating and saving a compensation value per block corresponding to the auto exposure value;

(e) calculating a distance between an object pixel and the second central pixel;

(f) producing a compensation value for the object pixel by using the compensation value per block corresponding to the distance between the object pixel and the second central pixel, and creating a shading mask image for each color; and (g) generating pixel compensation information by combining the primitive image data with the shading mask image and outputting the compensation pixel information, wherein the step (c) comprises:

setting a boundary luminance value to be located between a minimum value and a maximum value of the luminance information on each pixel of the pixel array;

detecting intersection pixels of a horizontal central line or a vertical central line both passing through the first central pixel and a closed curve produced by the luminance boundary value; and detecting the second central pixel by using the intersection pixels.

10. The lens shading compensation method of claim 9, wherein the step (b) further comprising setting an upper exposure limit and a lower exposure limit such that the auto exposure value is located therebetween.

11. The method of claim 10, wherein the step (d) comprises:

(d-1) partitioning the pixels in units of blocks according to the distance from the second central pixel;

(d-2) applying an arbitrary compensation value to the pixels included in the block, and counting the number of the pixels having a value between the upper auto exposure limit and the lower auto exposure limit; and (d-3) saving a compensation value, at which the counted number is the largest, as a compensation value of the block, wherein the steps (d-1) through (d-3) are repeatedly performed for the entire area of the primitive image data.

12. The method of claim 9, further comprising detecting a slope of the lens shading image, which is tilted in a direction, between the step (b) and the step (c).

13. The method of claim 12, further comprising producing a tilted mask image to compensate the slope between the step (f) and the step (g), wherein the step (g) generates the pixel compensation information by combining the shading mask image and the tilted mask image with the primitive image data.

* * * * *